US00RE51070E

(19) United States
(12) Reissued Patent
Yates

(10) Patent Number: US RE51,070 E
(45) Date of Reissued Patent: Oct. 13, 2026

(54) PRIMER FOR FIREARMS AND OTHER MUNITIONS

(71) Applicant: Spectre Materials Sciences, Inc., West Palm Beach, PA (US)

(72) Inventor: Daniel Yates, Melbourne, FL (US)

(73) Assignee: Spectre Materials Sciences, Inc., West Palm Beach, FL (US)

(21) Appl. No.: 18/622,994

(22) Filed: Mar. 31, 2024

Related U.S. Patent Documents

Reissue of:
(64) Patent No.: 11,650,037
Issued: May 16, 2023
Appl. No.: 17/673,457
Filed: Feb. 16, 2022

U.S. Applications:
(60) Provisional application No. 63/150,017, filed on Feb. 16, 2021.

(51) Int. Cl.
*F42C 19/08* (2006.01)
*F42C 19/10* (2006.01)

(52) U.S. Cl.
CPC ..... *F42C 19/0803* (2013.01); *F42C 19/083* (2013.01); *F42C 19/10* (2013.01)

(58) Field of Classification Search
CPC .... F42C 19/0803; F42C 19/083; F42C 19/10; F42C 19/0823; C06B 45/14; C06C 7/00
See application file for complete search history.

(56) References Cited

U.S. PATENT DOCUMENTS 2,131,352 A 9/1938 Marsh
2,239,123 A 4/1941 Stoneking
2,652,775 A 9/1953 Swanson
2,995,429 A 8/1961 Williams et al.
2,995,431 A 8/1961 Bice
3,122,884 A 3/1964 Grover et al.
3,155,749 A 11/1964 Rossen et al.
3,170,402 A 2/1965 Morton et al.
3,382,117 A 5/1968 Cook
3,610,151 A 10/1971 Nett
3,668,872 A 6/1972 Camp et al.
3,711,344 A 1/1973 Pierce
3,715,248 A 2/1973 Swotinsky et al.
3,725,516 A 4/1973 Kaufman
(Continued)

FOREIGN PATENT DOCUMENTS

EP 0122012 A2 * 10/1984 ..... C06C 7/00
EP 0 328 257 A2 1/1989
(Continued)

OTHER PUBLICATIONS

Extended European Search Report for European patent application No. 22756848.2.

(Continued)

*Primary Examiner* — Elizabeth L McKane
(74) *Attorney, Agent, or Firm* — Lang Patent Law LLC; William F. Lang, IV

(57) ABSTRACT

A primer includes a layered thermite coating comprising alternating layers of metal oxide and reducing metal (thermite) deposited upon a substrate. A carbide-containing ceramic layer is disposed within the alternating layers of metal oxide and reducing metal.

4 Claims, 5 Drawing Sheets

(56) References Cited

U.S. PATENT DOCUMENTS

| | | | |
|---|---|---|---|
| 3,808,061 | A | 4/1974 | Pierce |
| 3,896,731 | A | 7/1975 | Kilmer |
| 3,896,865 | A | 7/1975 | Comfort et al. |
| 3,905,846 | A | 9/1975 | Berta |
| 3,938,440 | A | 2/1976 | Dooley et al. |
| 3,956,890 | A | 5/1976 | Davis |
| 3,961,576 | A | 6/1976 | Montgomery, Jr. |
| 3,962,865 | A | 6/1976 | McCone, Jr. |
| 3,995,559 | A | 12/1976 | Bice |
| 4,013,743 | A | 3/1977 | Blasche, Jr. |
| 4,115,999 | A | 9/1978 | Diebold |
| 4,475,461 | A | 10/1984 | Durrell |
| 4,615,270 | A | 10/1986 | Bell |
| 4,651,254 | A | 3/1987 | Brede et al. |
| 4,756,251 | A | 7/1988 | Hightower, Jr. et al. |
| 4,823,699 | A | 4/1989 | Farinacci |
| 4,823,701 | A | 4/1989 | Wilhelm |
| 4,875,948 | A | 10/1989 | Vemeker |
| 4,963,203 | A | 10/1990 | Halcomb et al. |
| 4,996,922 | A | 3/1991 | Halcomb |
| 5,030,301 | A | 7/1991 | Stout et al. |
| 5,076,868 | A | 12/1991 | Doll et al. |
| 5,080,017 | A | 1/1992 | Asikainen |
| 5,237,927 | A | 8/1993 | Gonzalez |
| 5,266,132 | A | 11/1993 | Danen et al. |
| 5,320,043 | A | 6/1994 | Andre et al. |
| 5,322,018 | A | 6/1994 | Hadden |
| 5,363,768 | A | 11/1994 | Solberg |
| 5,378,499 | A | 1/1995 | Martin et al. |
| 5,589,661 | A | 12/1996 | Menke et al. |
| 5,721,392 | A | 2/1998 | Chan |
| 5,773,748 | A | 6/1998 | Makowiecki |
| 5,801,325 | A | 9/1998 | Willer et al. |
| 5,817,970 | A | 10/1998 | Feierlein |
| 5,854,439 | A | 12/1998 | Almstrom et al. |
| 6,090,756 | A | 7/2000 | Brown |
| 6,158,348 | A | 12/2000 | Campoli |
| 6,176,950 | B1 | 1/2001 | Wood et al. |
| 6,183,569 | B1 | 2/2001 | Mohler |
| 6,334,394 | B1 | 1/2002 | Zimmermann et al. |
| 6,363,853 | B1 | 4/2002 | Rohr |
| 6,364,975 | B1 | 4/2002 | Fleming et al. |
| 6,599,379 | B2 | 7/2003 | Hiskey et al. |
| 6,627,013 | B2 | 9/2003 | Carter, Jr. et al. |
| 6,679,960 | B2 | 1/2004 | Jones |
| 6,692,655 | B1 | 2/2004 | Martins et al. |
| 6,712,917 | B2 | 3/2004 | Gash et al. |
| 6,740,180 | B1 | 5/2004 | Cesaroni |
| 6,805,832 | B2 | 10/2004 | Mohler et al. |
| 6,843,868 | B1 | 1/2005 | Fawls et al. |
| 6,962,112 | B1 | 11/2005 | Kern |
| 7,770,380 | B2 | 8/2010 | Dulligan et al. |
| 7,886,668 | B2 | 2/2011 | Hugus et al. |
| 7,896,988 | B2 | 3/2011 | Mohler |
| 7,918,163 | B2 | 4/2011 | Dahlberg |
| 7,955,451 | B2 | 6/2011 | Hugus et al. |
| 7,958,823 | B2 | 6/2011 | Sawka |
| 7,998,290 | B2 | 8/2011 | Sheridan et al. |
| 8,202,377 | B2 | 6/2012 | Erickson et al. |
| 8,298,358 | B1 | 10/2012 | Coffey et al. |
| 8,454,769 | B2 | 6/2013 | Erickson et al. |
| 8,465,608 | B1 | 6/2013 | Coffey et al. |
| 8,505,427 | B2 | 8/2013 | Wilson et al. |
| 8,524,018 | B2 | 9/2013 | Busky et al. |
| 8,544,387 | B2 | 10/2013 | Dahlberg |
| 8,591,676 | B2 | 11/2013 | Coffey et al. |
| 8,641,842 | B2 | 2/2014 | Hafner et al. |
| 9,255,775 | B1 | 2/2016 | Rubin |
| 9,464,874 | B1 | 10/2016 | Mohler et al. |
| 9,709,366 | B1 | 7/2017 | Mohler et al. |
| 9,816,792 | B1 | 11/2017 | Mohler et al. |
| 10,254,090 | B1 | 4/2019 | Mohler et al. |
| 10,415,938 | B2 | 9/2019 | Mohler et al. |
| 10,882,799 | B2 | 1/2021 | Coffey et al. |
| 10,989,510 | B2 | 4/2021 | Mohler et al. |
| 11,112,222 | B2 | 9/2021 | Coffey et al. |
| 2002/0092438 | A1 | 7/2002 | Makowiecki |
| 2006/0011276 | A1 | 1/2006 | Grix et al. |
| 2006/0278119 | A1 | 12/2006 | Shilliday et al. |
| 2007/0099335 | A1 | 5/2007 | Gangopadhyay et al. |
| 2007/0169862 | A1 | 7/2007 | Hugus et al. |
| 2007/0272112 | A1 | 11/2007 | Nielson et al. |
| 2008/0028922 | A1 | 2/2008 | Wilson |
| 2008/0047453 | A1 | 2/2008 | Dahlberg |
| 2008/0134924 | A1 | 6/2008 | Sawka |
| 2009/0139422 | A1 | 6/2009 | Mohler |
| 2009/0178741 | A1 | 7/2009 | Xun et al. |
| 2010/0193093 | A1 | 8/2010 | Coffey et al. |
| 2010/0251694 | A1 | 10/2010 | Hugus et al. |
| 2010/0282115 | A1 | 11/2010 | Sheridan et al. |
| 2011/0067789 | A1 | 3/2011 | Grix et al. |
| 2011/0259230 | A1 | 10/2011 | Sawka et al. |
| 2011/0308416 | A1 | 12/2011 | Bar et al. |
| 2012/0103479 | A1 | 5/2012 | Katzakian et al. |
| 2012/0132096 | A1 | 5/2012 | Chin et al. |
| 2013/0305950 | A1 | 11/2013 | Coffman, II |
| 2014/0237879 | A1 | 8/2014 | Mirabile |
| 2016/0102030 | A1 | 4/2016 | Coffey et al. |
| 2016/0216095 | A1 | 7/2016 | Rami |
| 2019/0128656 | A1 | 5/2019 | Mohler et al. |
| 2020/0232772 | A1 | 7/2020 | Coffey et al. |
| 2020/0400415 | A1 | 12/2020 | Mohler et al. |

FOREIGN PATENT DOCUMENTS

| | | | | |
|---|---|---|---|---|
| GB | 885409 | A | 12/1961 | |
| GB | 944442 | A * | 12/1963 | ..... F42C 19/0815 |
| GB | 987332 | A | 3/1965 | |
| GB | 994184 | A | 6/1965 | |
| WO | WO 2005/121055 | A1 | 12/2005 | |

OTHER PUBLICATIONS

J. L. Gottfried, Improving the Explosive Performance of Aluminum Nanoparticles with aluminum Iodate Hexahydrate (AIH), 2018, https://www.nature.com/articles/s41598-018-26390-9.

Japanese office action dated Feb. 5, 2024.

Zirconium, Wikipedia, https://en.wikipedia.org/wiki/Zirconium, dated at least as early as Jan. 1, 2021.

Zirconium Carbide, Wikipedia, https://en.wikipedia.org/wiki/Zirconium_carbide, dated at least as early as Jan. 1, 2021.

K. Woll et al., The utilization of metal/metal oxide core shell powders to enhance the reactivity of diluted thermite mixtures, Combustion and Flame 167 (2016) 259-267.

A. H. Kinsey et al., Gas Suppressipn via Copper Interlayers in Magnetron Sputtered Al—Cu2O Multilayers, ACS Applied Materials & Interfaces, 2017, 22026-22036.

Aluminum Carbide, Wikipedia, https://en.wikipedia.org/wiki/Aluminium_carbide, dated at least as early as Jan. 1, 2021.

K. J. Blobaum et al., Deposition and characterization of a self-propagating CuOx/Al thermite reaction in a multilayer foil geometry, J. Appl. Phys., vol. 94, No. 5, 2003.

Carbide, Wikipedia, https://en.wikipedia.org/wiki/Carbide, dated at least as early as Jan. 1, 2021.

Ceramic, Wikipedia, https://en.wikipedia.org/wiki/Ceramic, dated at least as early as Jan. 1, 2021.

Detonator, Wikipedia, https://en.wikipedia.org/wiki/Detonator, dated at least as early as Jan. 1, 2021.

High Power Impulse Magnetron Sputtering, Wikipedia, https://en.wikipedia.org/wiki/High-power_impulse_magnetron_sputtering, dated at least as early as Jan. 1, 2021.

J. L. Gottfried, Improving the Explosive Performance of Aluminum Nanoparticles with aluminum Iodate Hexahydrate (AIH), 2018, https://www.nature.com/articles/s41598-018-26390-9.

G. C. Egan et al., Probing the Reaction Dynamics of Thermite Nanolaminates, J. Phys. Chem. 119, 2015, 20401-20408.

Thermite, Wikipedia, https://en.wikipedia.org/wiki/Thermite, dated at least as early as Jan. 1, 2021.

(56) References Cited

OTHER PUBLICATIONS

Titanium Carbide, Wikipedia, https://en.wikipedia.org/wiki/Titanium_carbide, dated at least as early as Jan. 1, 2021.
Versatile Reactive Sputtering Batch Drum Coater With Auxiliary Plasma, Deposition Sciences, Inc., 2004.
International search report and written opinion dated May 4, 2022.

* cited by examiner

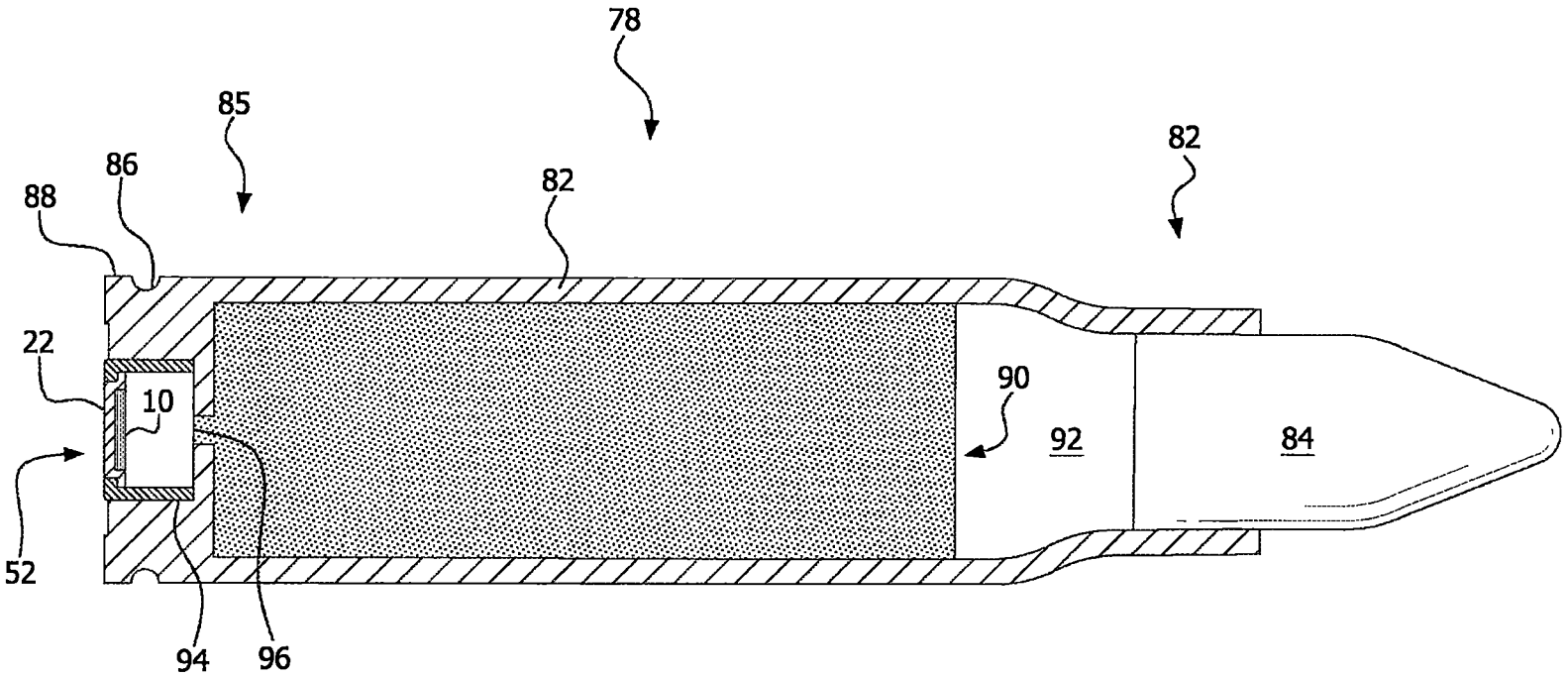
FIG. 5
Amended

PRIMER FOR FIREARMS AND OTHER MUNITIONS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

This application claims the benefit of U.S. provisional patent application Ser. No. 63/150,017, which was filed on Feb. 16, 2021, and entitled "Primer for Firearms and Other Munitions."

TECHNICAL FIELD

The present invention relates to primers for firearms and other munitions. More specifically, a primer made from layered metal oxide and reducing metal, along with a layer of a carbide-containing ceramic is provided.

BACKGROUND INFORMATION

Cartridges for firearms, as well as other munitions such as larger projectile cartridges and explosives are often ignited by a primer. Presently available primers and detonators are made from a copper or brass alloy cup with a brass anvil and containing lead azide or lead styphnate. When the base of the cup is struck by a firing pin, the priming compound is crushed between the cup's base and the anvil, igniting the primer charge. The burning primer then ignites another flammable substance such as smokeless powder, explosive substances, etc. Lead azide and lead styphnate are hazardous due to their toxicity as well as their highly explosive nature. Additionally, present manufacturing methods are very labor-intensive, with the necessary manual processes raising costs, causing greater difficulty in maintaining quality control.

Energetic materials such as thermite are presently used when highly exothermic reactions are needed. Uses include cutting, welding, purification of metal ores, and enhancing the effects of high explosives. A thermite reaction occurs between a metal oxide and a reducing metal. Examples of metal oxides include $La_2O_3$, AgO, $ThO_2$, SrO, $ZrO_2$, $UO_2$, BaO, $CeO_2$, $B_2O_3$, $SiO_2$, $V_2O_5$, $Ta_2O_5$, NiO, $Ni_2O_3$, $Cr_2O_3$, $MoO_3$, $P_2O_5$, $SnO_2$, $WO_2$, $WO_3$, $Fe_3O_4$, CoO, $Co_3O_4$, $Sb_2O_3$, PbO, $Fe_2O_3$, $Bi_2O_3$, $MnO_2$, $Cu_2O$, and CuO. Example reducing metals include Al, Zr, Th, Ca, Mg, U, B, Ce, Be, Ti, Ta, Hf, and La. The reducing metal may also be in the form of an alloy or intermetallic compound of the above-listed metals.

There is a need for a primer made from materials that do not share the toxicity of lead. There is a further need for a primer made from materials that lend themselves to automated processes. Another need exists for a primer made from energetic materials that lends itself to ignition through a strike by a firing pin, but which otherwise benefits from the stability of thermite.

SUMMARY

The above needs are met by a thermite primer. The primer has a substrate having a deposition surface and a rear surface. Alternating layers of metal oxide and reducing metal are deposited upon the substrate. The alternating layers of metal oxide and reducing metal are structured to react with each other in response to an impact applied to the rear face of the substrate. A carbide-containing ceramic layer is disposed within the alternating layers of metal oxide and reducing metal.

The above needs are also met by a cartridge for a firearm. The cartridge comprises a casing having a front end, a back end, and a hollow interior. The cartridge has a bullet secured within the front end of the casing, a propellant disposed within the hollow interior, and a primer secured within the back end of the casing. The primer is in communication with the propellant. The primer comprises a substrate having a deposition surface and a rear surface. The primer further comprises alternating layers of metal oxide and reducing metal deposited upon the substrate. The alternating layers of metal oxide and reducing metal are structured to react with each other in response to an impact applied to the rear surface of the substrate. The primer further comprises a carbide-containing ceramic layer within the alternating layers of metal oxide and reducing metal.

These and other aspects of the invention will become more apparent through the following description and drawings.

BRIEF DESCRIPTION OF THE DRAWINGS

FIG. 5 is a side elevational, cross sectional view of a cartridge using a primer cup of FIG. 4.

Like reference characters denote like elements throughout the drawings.

DETAILED DESCRIPTION

Figure 1:
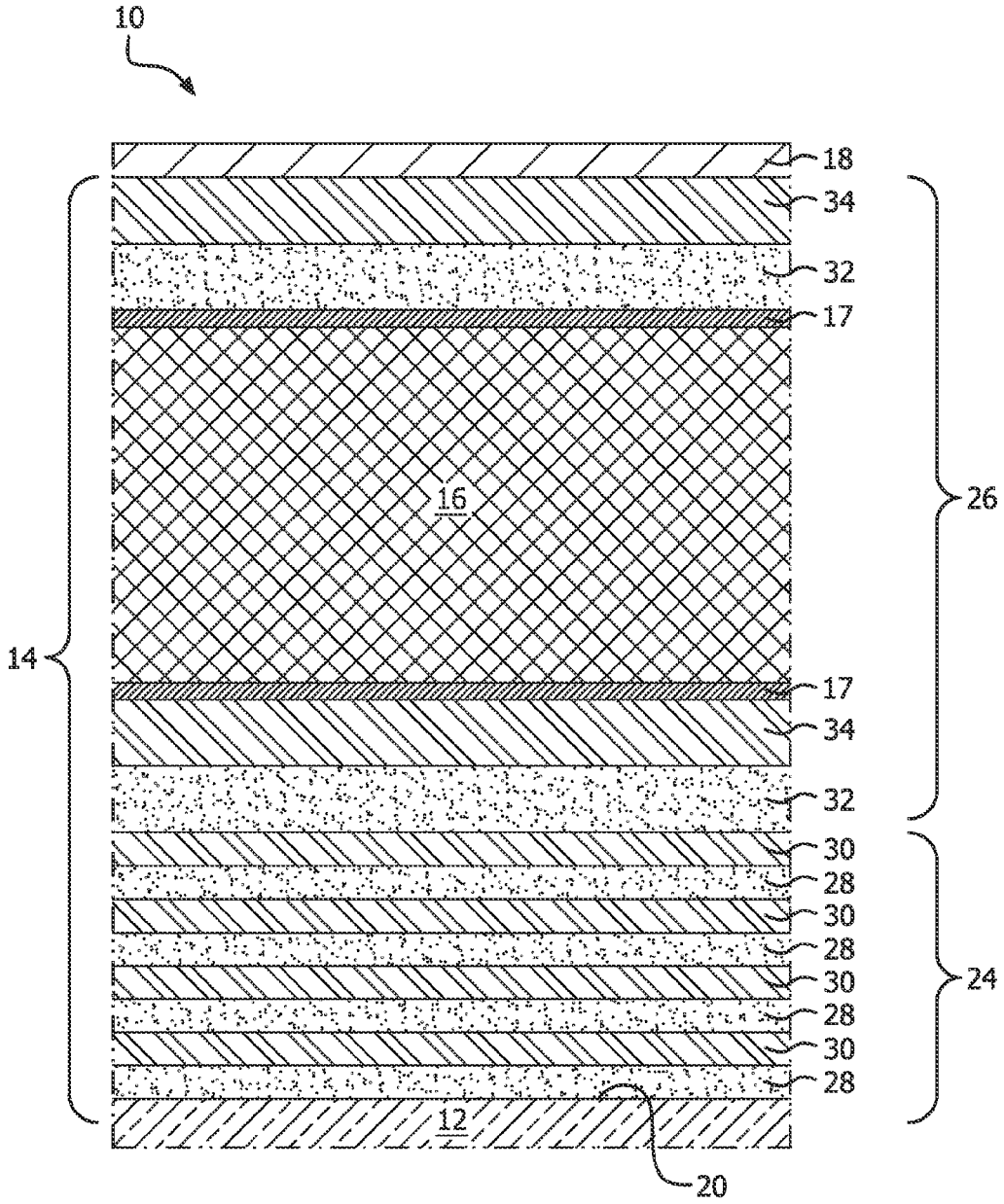
FIG. 1 is a sectional, side elevational view of a layered thermite structure, a carbide-containing ceramic layer, and passivation coating of a primer.
Figure 2:
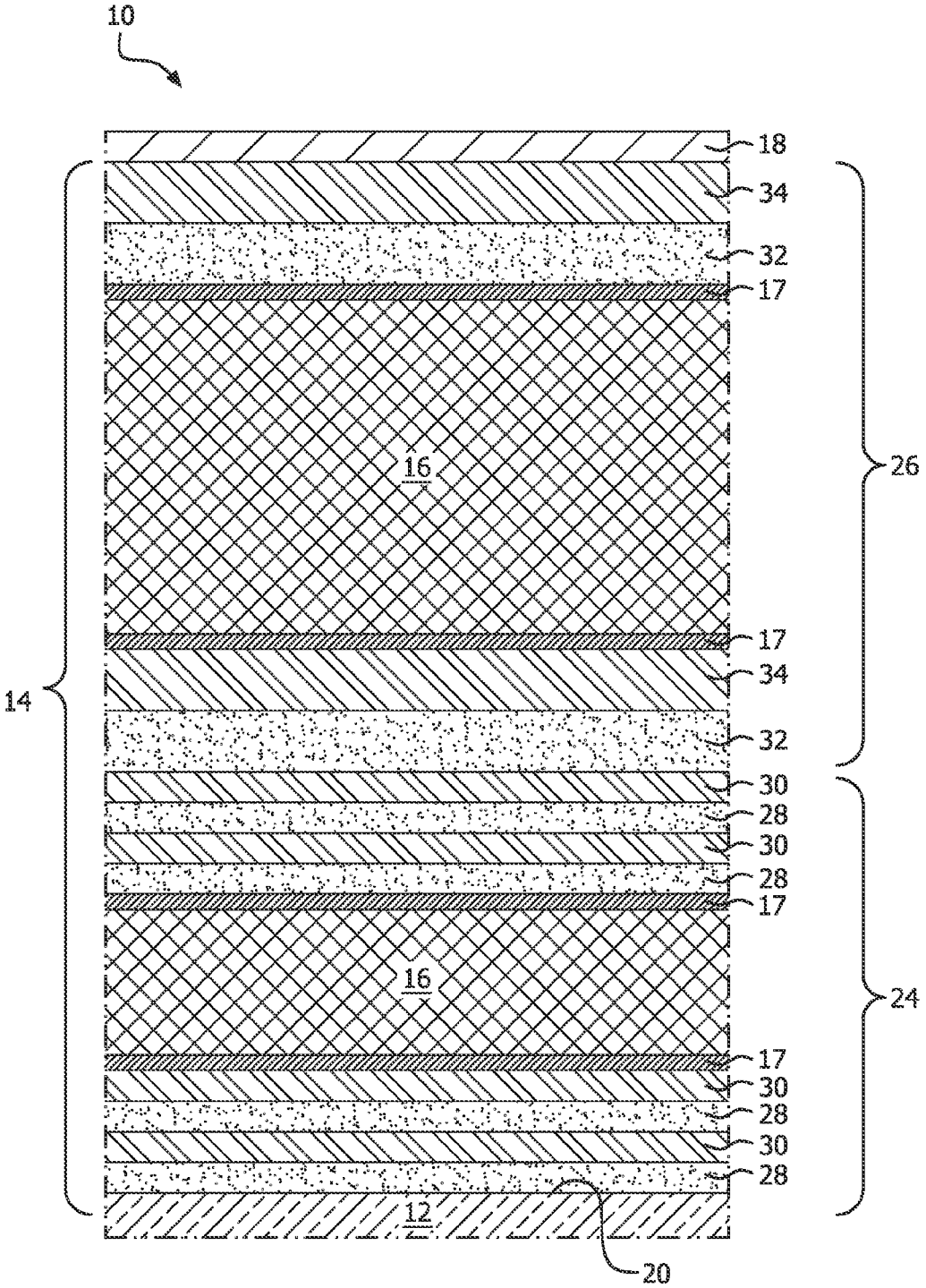
FIG. 2 is a sectional, side elevational view of an alternative layered thermite structure, a pair of carbide-containing ceramic layers, and passivation coating of a primer.
Figure 3:
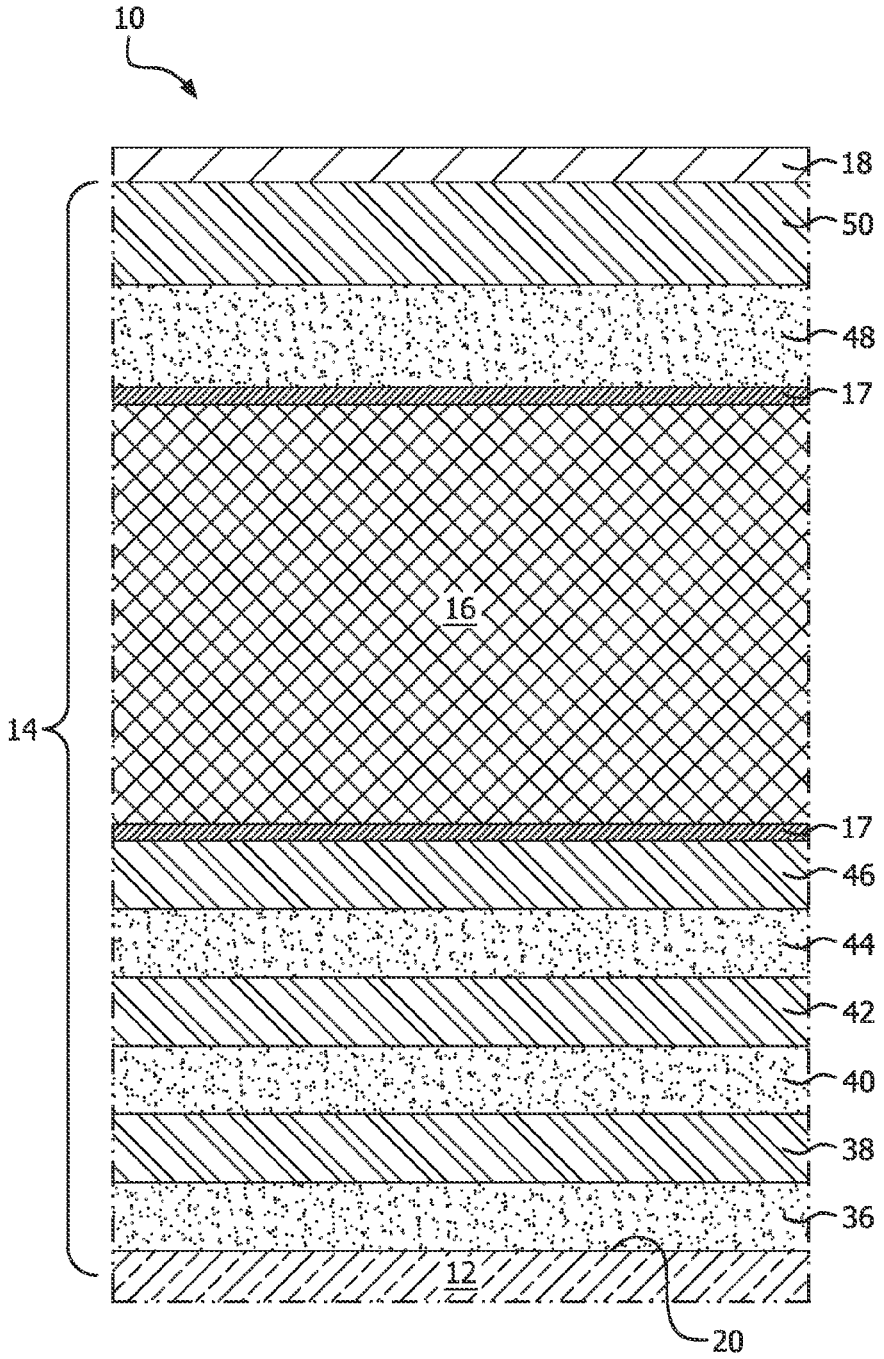
FIG. 3 is a sectional, side elevational view of another alternative layered thermite structure, a carbide-containing ceramic layer, and passivation coating of a primer.

Referring to FIGS. 1-3, a primer composition 10 is shown. The primer composition 10 is deposited upon a substrate 12. The primer composition includes a layered thermite coating 14, one or more carbide-containing ceramic layer(s) 16 within the layered thermite coating 14, and a passivation coating 18.

Figure 4:
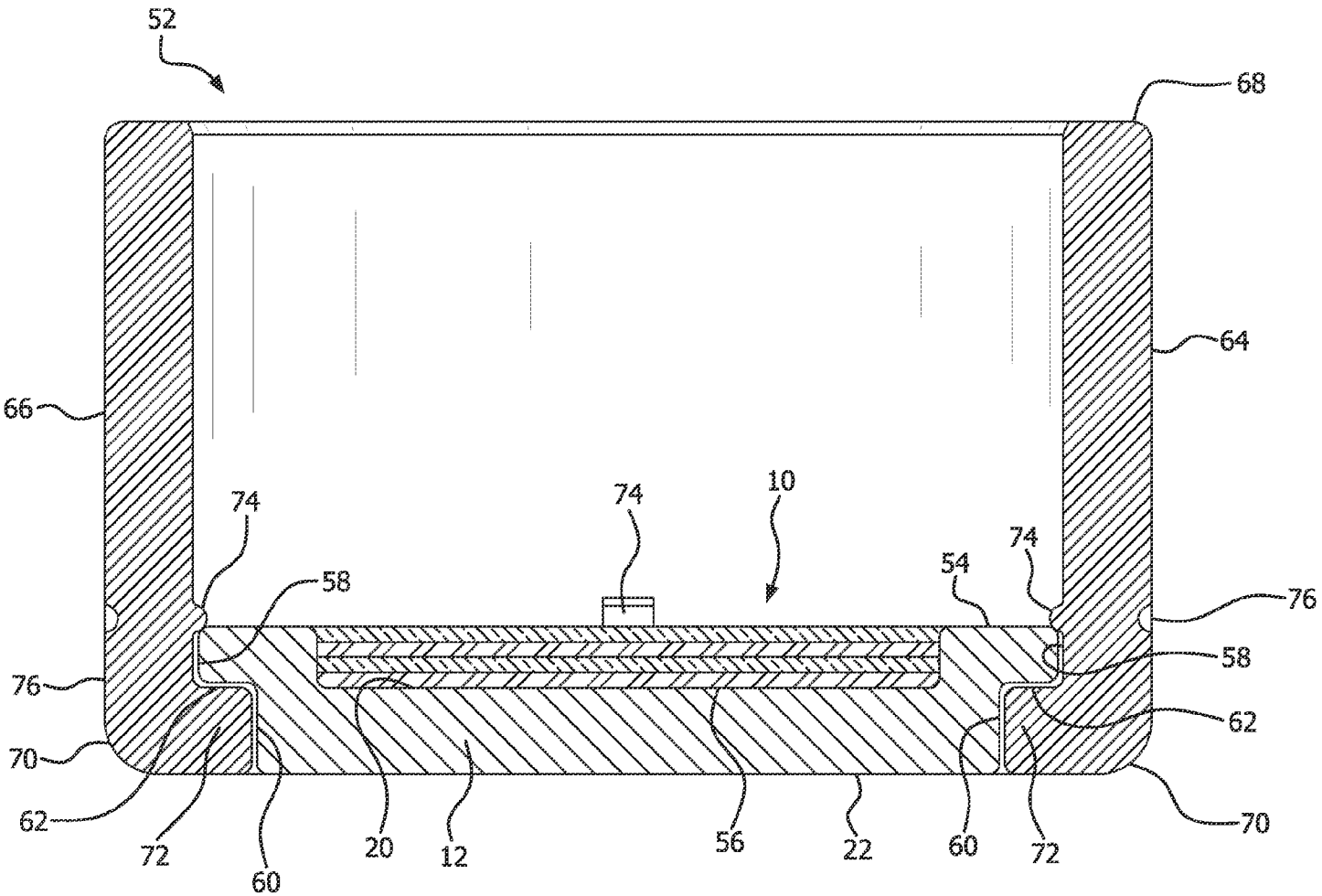
FIG. 4 is a side elevational, cross sectional view of a cup for use with a primer material of FIGS. 1-3.

The substrate 12 in the illustrated example is a malleable disk, made from a material such as brass, copper, soft steel, and/or stainless steel, having a deposition surface 20 upon which the layered thermite coating 14 is deposited, and a rear surface 22 (FIG. 4). The substrate 12 is a sufficiently thin and malleable so that a firing pin strike to the rear surface 22 will ignite the layered thermite coating 14 and carbide-containing ceramic layer(s) 16 as described below, but is sufficiently thick for ease of manufacturing the primer composition 10 as well as securing a primer made from the primer composition 10 within a cartridge case, munition, modified primer cup, or other location as described below. A preferred substrate thickness is about 0.005 inch to about 0.1 inch, and is more preferably about 0.01 to about 0.025 inch.

The layered thermite coating 14 includes alternating layers of metal oxide and reducing metal (with only a small number of layers illustrated for clarity). Examples of metal oxides include $La_2O_3$, AgO, $ThO_2$, SrO, $ZrO_2$, $UO_2$, BaO, $CeO_2$, $B_2O_3$, $SiO_2$, $V_2O_5$, $Ta_2O_5$, NiO, $Ni_2O_3$, $Cr_2O_3$, $MoO_3$, $P_2O_5$, $SnO_2$, $WO_2$, $WO_3$, $Fe_3O_4$, CoO, $Co_3O_4$, $Sb_2O_3$, PbO, $Fe_2O_3$, $Bi_2O_3$, $MnO_2$, $Cu_2O$, and CuO. Example reducing metals include Al, Zr, Th, Ca, Mg, U, B, Ce, Be, Ti, Ta, Hf, and La. The metal oxide and reducing metal are preferably selected to resist abrasion or other damage to a barrel of a firearm with which a cartridge containing the primer is used by avoiding reaction products which could potentially cause such damage. One example of such a combination of metal oxide and reducing metal is cupric oxide and magnesium.

The thickness of each metal oxide layer and reducing metal layer are determined to ensure that the proportions of metal oxide and reducing metal are such so that both will be substantially consumed by the exothermic reaction. As one example, in the case of a metal oxide layer made from CuO and reducing metal layer made from Mg, the chemical reaction is $CuO+Mg \rightarrow Cu+MgO+heat$. The reaction therefore requires one mole of CuO, weighing 79.5454 grams/mole, for every one mole of Mg, weighing 24.305 grams/mole. CuO has a density of 6.315 g/cm$^3$, and magnesium has a density of 1.74 g/cm$^3$. Therefore, the volume of CuO required for every mole is 12.596 cm$^3$. Similarly, the volume of Mg required for every mole is 13.968 cm$^3$. Therefore, within the illustrated example, each layer of metal oxide is about the same thickness or slightly thinner than the corresponding layer of reducing metal. If other metal oxides and reducing metals are selected, then the relative thickness of the metal oxide and reducing metal can be similarly determined.

The illustrated example in FIGS. 1 and 2 of a layered thermite coating 14 is divided into an initial ignition portion 24 that is deposited directly onto the substrate 12, and a secondary ignition portion 26 that is deposited onto the initial ignition portion 24. The illustrated example of the initial ignition portion 24 includes layers of metal oxide 28 and reducing metal 30 that are thinner than the layers of metal oxide 32 and reducing metal 34 within the secondary ignition portion 26. In the illustrated example, each metal oxide 28 and reducing metal 30 pair of layers are preferably between about 20 nm and about 100 nm thick, with the illustrated example having pairs of layers that are about 84 nm thick. In the illustrated example, each pair of metal oxide 32 and reducing metal 34 layers are thicker than about 100 nm thick. Thinner layers result in more rapid burning and easier ignition, while thicker layers provide a slower burn rate. The thinner layers 28, 30 within the initial ignition portion 24 are more sensitive to physical impacts, thereby facilitating ignition in response to a firing pin strike to the rear surface 22 of the substrate 12, and ignite the secondary ignition portion 26. The thicker layers 32, 34 within the secondary ignition portion 26 burn more slowly, enhancing the reliability of the ignition of the smokeless powder, explosive, or other desired ignitable substance. The total thickness of the illustrated examples of the layered thermite coating 14 is between about 25 μm and about 1,000 μm.

The illustrated example of the thermite coating 14 in FIGS. 1 and 2 shows a generally uniform thickness for all layers 28, 30 within the initial ignition portion 24. Similarly, a generally uniform thickness is shown within the layers 32, 34 within the secondary ignition portion 26. Other examples may include metal oxide and reducing metal layers having differing thicknesses. For example, FIG. 3 shows a primer composition 10 having thermite layers that increase generally proportionally with the distance of the layer from the substrate 12 (with only a small number of layers shown for clarity). Layers 36 and 38, which are close to the substrate 12, have a smaller thickness, for example, between about 20 nm and about 100 nm thick. Layers 40 and 42 have increased thickness. Layers 44 and 46, farther still from the substrate 12, have greater thickness than layers 40 and 42. Layers 48 and 50, adjacent to the passivation coating 18 and farthest from the substrate 12, are the thickest layers, and are thicker than about 100 nm thick. As before, the total thickness of the illustrated examples of the layered thermite coating is between about 25 μm and about 1,000 μm. Such a thermite coating would provide essentially the same advantage of rapid ignition close to the substrate 12, and relatively slower burning farther from the substrate 12 and closer to the smokeless powder, explosive, or other ignitable substance. With such gradually increasing thickness, a clear boundary between an initial ignition portion and secondary ignition portion may not exist, and a definite boundary is not essential to the functioning of the invention.

As another example, all layers of metal oxide and reducing metal may be less than about 100 nm thick, and the time required to consume all layers of metal oxide and reducing metal may be increased sufficiently to ignite conventional propellants and explosives by simply increasing the number of layers of metal oxide and reducing metal.

Other examples of the layered thermite coating 14 may include layers 28, 30, 32, 34, or layers 36, 38, 40, 42, 44, 46, 48, 50, that are deposited under different temperatures, so that each layer is deposited under a temperature which is either sufficiently higher or sufficiently lower than the adjacent layers to induce thermal expansion and contraction stresses within the layered thermite coating 14 once temperature is equalized within the layered thermite coating. Such expansion and contraction stresses are anticipated to result in increased sensitivity to ignition through a physical impact.

A passivation layer 18 covers the layered thermite coating 14, protecting the metal oxide and reducing metal within the layered thermite coating 14. One example of a passivation layer 18 is silicon nitride. Alternative passivation layers 18 can be made from reactive metals that self-passivate, for example, aluminum or chromium. When oxide forms on the surface of such metals, the oxide is self-sealing, so that oxide formation stops once the exposed surface of the metal is completely covered with oxide.

The carbide-containing ceramic layer(s) 16 are disposed within the thermite layers 14. In the illustrated examples, one carbide-containing ceramic layers 16 is disposed about ⅓ of the distance to the top of the thermite coating 14. In other examples, a carbide-containing ceramic layer 16 may be located elsewhere in the thermite coating 14, such as a lower portion, a central portion, the top, the bottom, or elsewhere in the upper portion of the thermite coating 14. Some examples may include a plurality of layers carbide-containing ceramic layers 16 which are located in different positions throughout the thermite coating 14. Although one or two layers are illustrated, three or more layers may be utilized. The thickness of the carbide-containing ceramic layer(s) 16 is thicker than the metal oxide or reducing metal layers, and in the illustrated example is between about 100 nm and about 2 μm thick. Other examples of the carbide-containing ceramic layer(s) 16 may be between about 500 nm and about 1 μm thick.

Carbide-containing ceramics are selected for their propensity, when ignited by ignition of the adjacent reducing metal and metal oxide, to project relatively large (as compared to the thermite reaction products) particles into the propellant of a firearm cartridge or other ignitable or detonatable material. Examples include ceramics such as zirconium carbide, titanium carbide, or silicon carbide, as well as aluminum carbide (which is a metal-ceramic composite but will be considered to be a carbide-containing ceramic herein), and combinations thereof. If more than one carbide-containing ceramic layer is present, then the different carbide-containing ceramic layers may be composed of the same carbide-containing ceramic, or different carbide-containing ceramics. Ignition of these carbides (or other suitable carbides) will result in the formation of carbon dioxide through the reaction with oxygen from the cupric oxide. This gas production will aid in propelling the reaction products of the thermite as well as the reaction products of the carbide-containing ceramic into the propellant or other ignitable or detonatable material. The large, hot particles resulting from the reaction of the carbide-containing ceramic with oxygen will burn for a sufficient period of time to ensure reliable ignition of the propellant or other ignitable or detonatable material.

Some examples of the primer compound 10 may include an adhesion layer 17 above and below each carbide-containing ceramic layer 16. In the illustrated example, the adhesion layers 17 are made from titanium or chromium. Nickel may also be used as an adhesion layer in some examples. The illustrated examples of the adhesion layers 17 are about 5 nm to about 10 nm thick.

A layered thermite coating 14 can be made by sputtering or physical vapor deposition. In particular, high power impulse magnetron sputtering can rapidly produce the thermite coating 14. As another option, specific manufacturing methods described in U.S. Pat. No. 8,298,358, issued to Kevin R. Coffey et al. on Oct. 30, 2012, and U.S. Pat. No. 8,465,608, issued to Kevin R. Coffey et al. on Jun. 18, 2013, are suited to depositing the alternating metal oxide and reducing metal layers in a manner that resists the formation of oxides between the alternating layers, and the entire disclosure of both patents is expressly incorporated herein by reference. Dr. Coffey's methods permit the interface between alternating metal oxide and reducing metal layers to be either substantially free of metal oxide, or if reducing metal oxides are present, then the reducing metal oxide layer forming the interface will have a thickness of less than about 2 nm. Or a thickness of less than 1 nm. In many examples, the interface will be sufficiently thin so that most of the interface is non-measurable during high-resolution transmission electron microscope detection. Depositing individual layers of the metal oxide and reducing metal under elevated and/or reduced temperatures can optionally be used to create expansion/contraction stresses with respect to other layers within the layered thermite coating 14 as these layers return to room temperature, thereby enhancing the sensitivity of primers 10 to firing pin strikes. If desired, lithography can be used to remove undesired portions of each layer in regions of the substrates 12 where the deposited material is not desired, leaving only that portion which is intended to be coated with the primer composition 10.

A layered thermite coating 14 can also be made using a deposition system using a rotating drum. Such systems are described in the following patents or published applications, the entire disclosure of all of which are expressly incorporated herein by reference: U.S. Pat. No. 8,758,580, which was issued to R. DeVito on Jun. 24, 2014; U.S. Pat. No. 5,897,519, which was issued to J. W. Seeser et al. on Mar. 9, 1999; and EP 0,328,257, which was invented by M. A. Scobey et al. and published on Aug. 16, 1989. The use of a rotating drum system permits the substrates to be rapidly transferred between different chambers for deposition of different layers made from different materials. In one example, some chamber(s) will be used to deposit the reducing metal, other chamber(s) will be used to deposit the metal oxide, and still other chamber(s) will be used to deposit the carbide-containing ceramic. In a four chamber system, other chambers may be used to deposit the adhesion layers above and below the carbide-containing ceramic. One example may utilize between two and four chambers, with two targets per chamber. The atmospheric conditions within each chamber are maintained, and isolated from other portions of the system, by baffles which extend close to the drum while maintaining separation from the substrates. Substrates may thereby be moved between chambers by rotating the drum upon which the substrates are located while maintaining the correct pressure and atmospheric conditions of each chamber throughout the process of depositing multiple layers. Additionally, the pressure of an inert gas, for example, argon in the chamber utilized to deposit reducing metal may be greater than the pressure in the chamber utilized to deposit metal oxide, thus resisting the entry of oxygen into the reducing metal chamber. The need to pump down each chamber between layers of different material is thus avoided, speeding and simplifying the deposition process.

Once all layers of metal oxide 28, 30, reducing metal 32, 34, and carbide-containing ceramic 16 are deposited, the passivation layer 18 may be deposited onto the layered thermite coatings 14 using any of the above-described methods.

FIG. 4 illustrates an example of a primer 52 utilizing the primer composite 10. The illustrated example of the substrate 12 is a disk having an upper surface 54 defining a recess 56 in which the deposition surface 20 is located. The edge of the disk 52 includes a larger diameter portion 58 and a smaller diameter portion 60, forming a ledge 62 therebetween. The primer composite 10 is deposited on the surface 20 within the recess 56 as described above. The disk (substrate) 12 is then placed within a cup 64 to form a complete primer. The cup 64 includes a sidewall 66 having an upper and 68 and a lower and 70. The lower and 70 includes an inward projection 72 that is dimensioned and configured to abut the ledge 62 and a smaller diameter 60 of the disc 12. When the disc 12 is inserted into the cup 64 through the upper and 68, and then placed in position against the lower and 70, passage of the disc 12 out of the bottom and 70 of the cup is thus resisted. The disc 12 may then be retained in the cup 64 by the inward projections 74 which engage the top surface 54 of the disc. The inward projections 74 may be formed by punching inward against the outer portion of the wall 66 to form depressions 76, thus creating a projection 74. Some examples may also, or alternatively retain the disc 12 within the cup 64 utilizing an adhesive.

Referring to FIG. 5, the primer 52 may then be placed within a conventional firearm cartridge 78. The cartridges 78 includes a casing 80 having a standard configuration. The casing 80 includes a front end 82 that is structured to retain a bullet 84 therein. The casing 80 also includes a back end [84] *85* having a groove 86 and rent 88 to assist with extraction of the cartridge 78. A propellant 90 within the hollow central portion 92 of the casing 80. The back end [84] *85* of the casing 82 defines a primer pocket 94 and a flash hole 96 extending between the primer pocket 94 and hollow central portion 92. Striking the surface 22 with a firing pin ignites the priming compound 10, driving reaction products through the flash hole 96 and into the propellant 92 discharge the bullet 84.

As another example, the primer compound 10 can be used as the deposited ignitable material within the primer disclosed within US 2020/0400415, which was invented by Timothy Mohler and Daniel Yates and published on Dec. 24, 2020, the entire disclosure of which is expressly incorporated herein by reference.

Although the illustrated examples are for a firearm cartridge, the primer composition 10 can be used for a larger projectile cartridge such as those for artillery, or for other munitions such as hand grenades and other explosives that utilize a primer as part of their detonation mechanism.

The present invention therefore provides a primer made from materials that do not have the toxicity or other safety issues of conventional primers. The primers are easily manufactured by methods that lend themselves to automation. The primer provides at least the reliability of conventional primers while also taking advantage of the stability of thermite. By adjusting the thickness of the thermite layers within the primary and secondary ignition portions, as well as by the optional creation of expansion/contraction stresses, the sensitivity of the primer can be adjusted, and tailored to specific applications. The location and thickness of the carbide-containing ceramic layers can also be tailored to specific applications. The primer is useful not only for firearm cartridges, but also for other projectiles such as artillery, grenades, and other explosives and munitions. One example of the primer will fit within a space designed for a conventional primer.

A variety of modifications to the above-described embodiments will be apparent to those skilled in the art from this disclosure. For example, the shape of the primer may be round, square, rectangular, or have an entirely different shape, with or without a beveled edge, or with the beveled edge on either side of the primer. The primer may fit a conventional or unconventional primer pocket. Thus, the invention may be embodied in other specific forms without departing from the spirit or essential attributes thereof. The particular embodiments disclosed are meant to be illustrative only and not limiting as to the scope of the invention. The appended claims, rather than to the foregoing specification, should be referenced to indicate the scope of the invention.

What is claimed is:

[1. A primer, comprising:

a substrate having a deposition surface and a rear surface;

alternating layers of metal oxide and reducing metal deposited upon the substrate, the alternating layers of metal oxide and reducing metal being structured to react with each other in response to an impact applied to the rear surface of the substrate; and a carbide-containing ceramic layer within the alternating layers of metal oxide and reducing metal;

whereby, when the alternating layers of metal oxide and reducing metal react with each other, the carbide-containing ceramic layer is ignited by the reaction between the reducing metal and metal oxide.]

[2. The primer according to claim 1, wherein the carbide-containing ceramic layer is zirconium carbide, titanium carbide, aluminum carbide, silicon carbide, or a combination thereof.]

[3. A primer, comprising:

a substrate having a deposition surface and a rear surface;

alternating layers of metal oxide and reducing metal deposited upon the substrate, the alternating layers of metal oxide and reducing metal being structured to react with each other in response to an impact applied to the rear surface of the substrate; and a carbide-containing ceramic layer within the alternating layers of metal oxide and reducing metal, the carbide-containing ceramic layer having a thickness of about 100 nm to about 2 μm.]

4. A primer, comprising:

a substrate having a deposition surface and a rear surface;

alternating layers of metal oxide and reducing metal deposited upon the substrate, the alternating layers of metal oxide and reducing metal being structured to react with each other in response to an impact applied to the rear surface of the substrate;

a carbide-containing ceramic layer within the alternating layers of metal oxide and reducing metal; and an adhesion layer [between] *separating* the carbide-containing ceramic layer and each metal oxide layer or reducing metal layer that is directly adjacent to the carbide-containing ceramic layer.

5. The primer according to claim 4, wherein each adhesion layer is either titanium, chromium, or nickel.

[6. A cartridge for a firearm, the cartridge comprising:

a casing having a front end, a back end, and a hollow interior;

a bullet secured within the front end of the casing;

a propellant disposed within the hollow interior;

a primer secured within the back end of the casing, the primer being in communication with the propellant, the primer comprising;

a substrate having a deposition surface and a rear surface;

alternating layers of metal oxide and reducing metal deposited upon the substrate, the alternating layers of metal oxide and reducing metal being structured to react with each other in response to an impact applied to the rear surface of the substrate; and a carbide-containing ceramic layer within the alternating layers of metal oxide and reducing metal;

whereby, when the alternating layers of metal oxide and reducing metal react with each other, the carbide-containing ceramic layer is ignited by the reaction between the reducing metal and metal oxide.]

[7. The cartridge according to claim 6, wherein the carbide-containing ceramic layer is zirconium carbide, titanium carbide, aluminum carbide, silicon carbide, or a combination thereof.]

[8. A cartridge, comprising:

a casing having a front end, a back end, and a hollow interior;

a bullet secured within the front end of the casing;

a propellant disposed within the hollow interior;

a primer secured within the back end of the casing, the primer being in communication with the propellant, the primer comprising:

a substrate having a deposition surface and a rear surface;

alternating layers of metal oxide and reducing metal deposited upon the substrate, the alternating layers of metal oxide and reducing metal being structured to react with each other in response to an impact applied to the rear surface of the substrate; and a carbide-containing ceramic layer within the alternating layers of metal oxide and reducing metal, the carbide-containing ceramic layer having a thickness of about 100 nm to about 2 μm.]

9. A cartridge, comprising:

a casing having a front end, a back end, and a hollow interior;

a bullet secured within the front end of the casing;

a propellant disposed within the hollow interior;

a primer secured within the back end of the casing, the primer being in communication with the propellant, the primer comprising:

a substrate having a deposition surface and a rear surface;

alternating layers of metal oxide and reducing metal deposited upon the substrate, the alternating layers of metal oxide and reducing metal being structured to react with each other in response to an impact applied to the rear surface of the substrate;

a carbide-containing ceramic layer within the alternating layers of metal oxide and reducing metal; and an adhesion layer [between] *separating* the carbide-containing ceramic layer and each metal oxide layer or reducing metal layer that is directly adjacent to carbide-containing ceramic layer.

10. The cartridge according to claim 9, wherein each adhesion layer is titanium, chromium, or nickel.

* * * * *